United States Patent [19]

Johnson et al.

[11] Patent Number: 4,988,144
[45] Date of Patent: Jan. 29, 1991

[54] PLENUM AND WIPER MODULE REMOVABLE FOR ENGINE SERVICE

[75] Inventors: Roger E. Johnson, Utica; Thomas C. Jensen, Clarkston; Robert A. Brani, Utica, all of Mich.

[73] Assignee: General Motors Corporation, Detroit, Mich.

[21] Appl. No.: 465,846

[22] Filed: Jan. 16, 1990

[51] Int. Cl.$^5$ .............................................. B62D 25/08
[52] U.S. Cl. .................................... 296/192; 296/194; 15/250.16
[58] Field of Search ............................ 296/192, 194; 15/250.16

[56] References Cited

U.S. PATENT DOCUMENTS

| 3,264,670 | 8/1966 | Barenyi et al. | 15/270.27 |
| 4,391,465 | 7/1983 | Piano | 296/208 |
| 4,521,050 | 6/1985 | Rea et al. | 296/194 |

Primary Examiner—Robert R. Song
Attorney, Agent, or Firm—Charles E. Leahy

[57] ABSTRACT

A C-shaped panel is mounted on the engine compartment side of the engine bulkhead structure and has upper and lower walls projecting forwardly form the bulkhead structure to overhang the engine. A vertically extending front wall is spaced forwardly of the bulkhead by the upper and lower walls to define therewith a transverse air flow communicating passage. Air inlet openings are provided in the top wall to admit air into the passage. The C-shaped panel overlies an opening through the bulkhead to communicate inlet air to the heating, ventilating and air conditioning system. A plurality of removable fasteners removably fasten the panel on the bulkhead to permit removal of the C-shaped panel from overhanging the engine to thereby facilitate and enable engine repair and removal. The windshield wiper motor is mounted on the C-shaped panel within the air flow passage so that removal of the C-shaped panel upon release of the removable fasteners also removes the windshield wiper system for repair and replacement.

3 Claims, 2 Drawing Sheets

PLENUM AND WIPER MODULE REMOVABLE FOR ENGINE SERVICE

The Invention relates to an air inlet plenum for a vehicle body and more particularly provides an air inlet plenum which houses the windshield wiper and is removable from the vehicle bulkhead structure to enable engine service and removal.

BACKGROUND OF THE INVENTION

It is well known in motor vehicle bodies to provide a bulkhead structure which separates the passenger compartment from the engine compartment. The vehicle windshield conventionally slants forward and has its lower end mounted on the top of the bulkhead structure. An air inlet plenum is conventionally located just forward of the bottom of the windshield and has a screen covered inlet opening which admits outside air for the heating, ventilating and air conditioning system. The air inlet plenum necessarily extends somewhat forward from the bulkhead structure and into the space which could otherwise be utilized for the engine. Modern automobile styling with reduced aerodynamic drag dictates that the windshield be highly slanted so that the location of the air inlet plenum located forwardly of the windshield increasingly occupies space which would otherwise be available for access to the engine.

The present invention provides a new an improved air inlet plenum for a motor vehicle bulkhead structure which is removable from the bulkhead structure to facilitate engine servicing and removal.

SUMMARY OF THE INVENTION

According to the invention a motor vehicle bulkhead structure extends transversely between the passenger compartment and the engine compartment. A C-shaped panel is mounted on the engine compartment side of the bulkhead structure and has upper and lower walls projecting forwardly form the bulkhead structure to overhang the engine. A vertically extending front wall is spaced forwardly of the bulkhead by the upper and lower walls to define therewith a transverse air flow communicating passage. Air inlet openings are provided in the top wall to admit air into the passage. The C-shaped panel overlies an opening through the bulkhead to communicate inlet air to the heating, ventilating and air conditioning system. A plurality of removable fasteners removably fasten the panel on the bulkhead to permit removal of the C-shaped panel from overhanging the engine to thereby facilitate and enable engine repair and removal. The windshield wiper motor and transmission assembly is mounted on the C-shaped panel within the air flow passage so that removal of the C-shaped panel upon release of the removable fasteners also removes the windshield wiper system.

Accordingly, the object, feature and advantage of the invention resides in the provision of a removable air inlet plenum structure for a vehicle body which is removably fastened to permit removal thereof from over hanging the engine to facilitate repair and removal of the engine.

Another feature, object and advantage of the invention resides in the provision of a modular air inlet plenum structure comprised of a panel attached to the engine compartment side of the vehicle bulkhead structure and having the windshield wiper motor mounted thereon, with the panel being attached with removable fasteners whereby the plenum and windshield wiper motor and transmission assembly ordinarily overhanging the engine compartment may be removed as a module to enable engine repair and removal.

BRIEF DESCRIPTION OF THE DRAWING

These and other features, objects and advantages of the invention will become apparent upon consideration of the description of the preferred embodiment and the appended drawings in which.

DESCRIPTION OF THE PREFERRED EMBODIMENT

Figure 1:
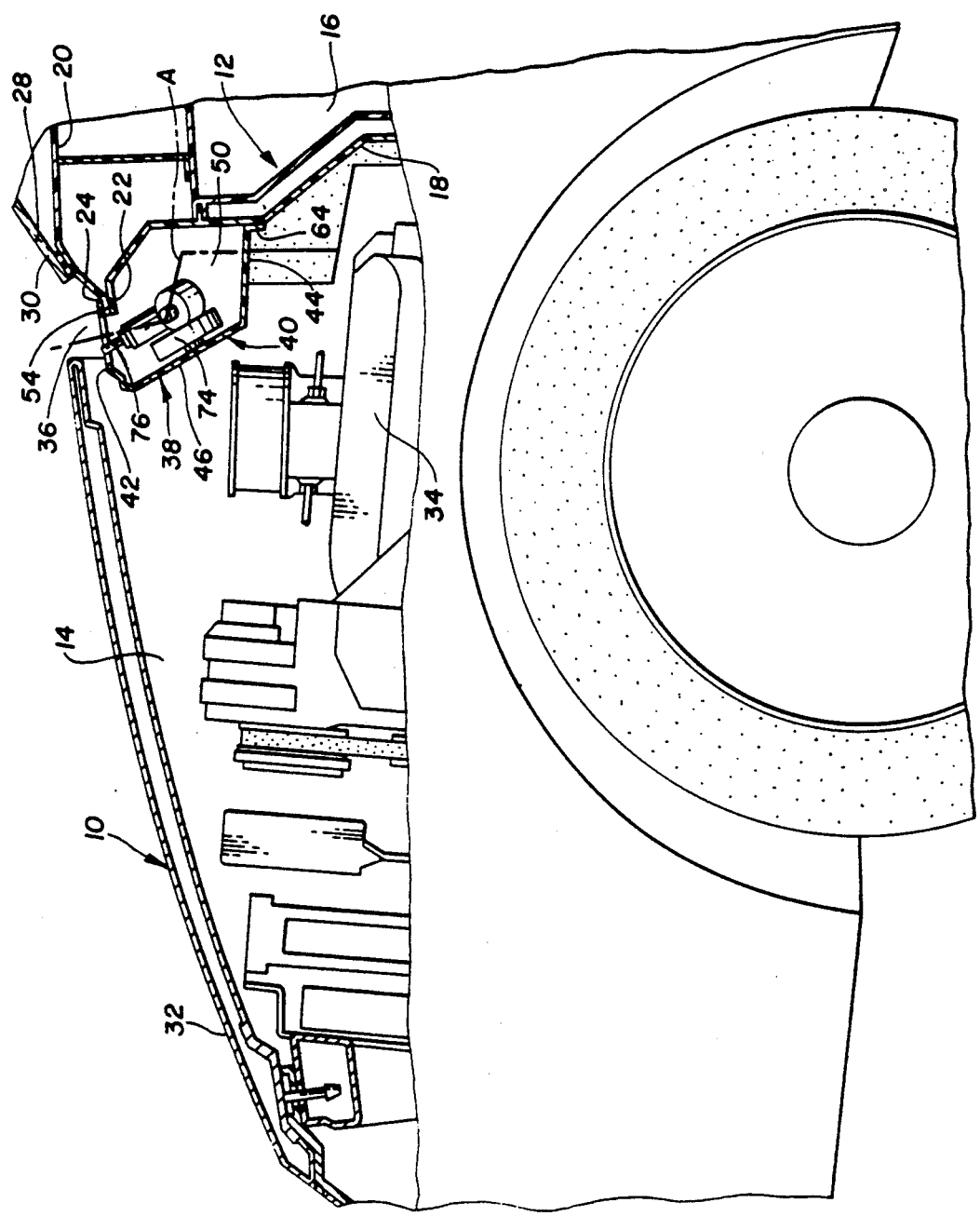
FIG. 1 is a side elevation view of a motor vehicle front end having parts broken away and in section to show a removable air inlet plenum over hanging the vehicle engine compartment.

Referring to FIG. 1, it is seen that the front end structure of a motor vehicle 10 includes a bulkhead structure generally indicated at 12 which divides the vehicle into an engine compartment 14 and a passenger compartment 16. The bulkhead structure 12 is comprised of various reinforced plastic composite panels including front wall 18 and a top wall 20 which respectively have flanges 22 and 24 which overlie one another and are bonded together. Alternatively, the panels of the bulkhead structure may be stamped metal panels welded together.

As best seen in FIG. 1, the vehicle has a windshield 28 which slants sharply and has a front edge 30 which is suitably adhesively bonded onto the top panel 20 of the bulkhead structure 12. The engine compartment 14 is closed by a engine compartment lid 32 which is suitably hinged for movement between opened and closed positions. An engine generally indicated at 34 is housed within the engine compartment 14. The engine compartment lid 32 stops short of reaching the windshield 28 to provide an air inlet space 36 therebetween. An air inlet plenum structure, generally indicated at 38, is provided on the front wall 18 of the bulkhead structure 12 to admit air for the heating, ventilating and air conditioning system. As seen in FIG. 1, this plenum structure 38 necessarily projects forward of the forward wall 18 in order to underlie the inlet space 36 between the front edge of the windshield 28 and the rear end of the engine compartment lid 32. Accordingly, as seen in FIG. 1, the inlet plenum 38 substantially overhangs the engine compartment to somewhat obstruct the engine compartment space 14 and thereby complicate efforts to service the engine or remove the engine 34 from the engine compartment 14.

Figure 2:
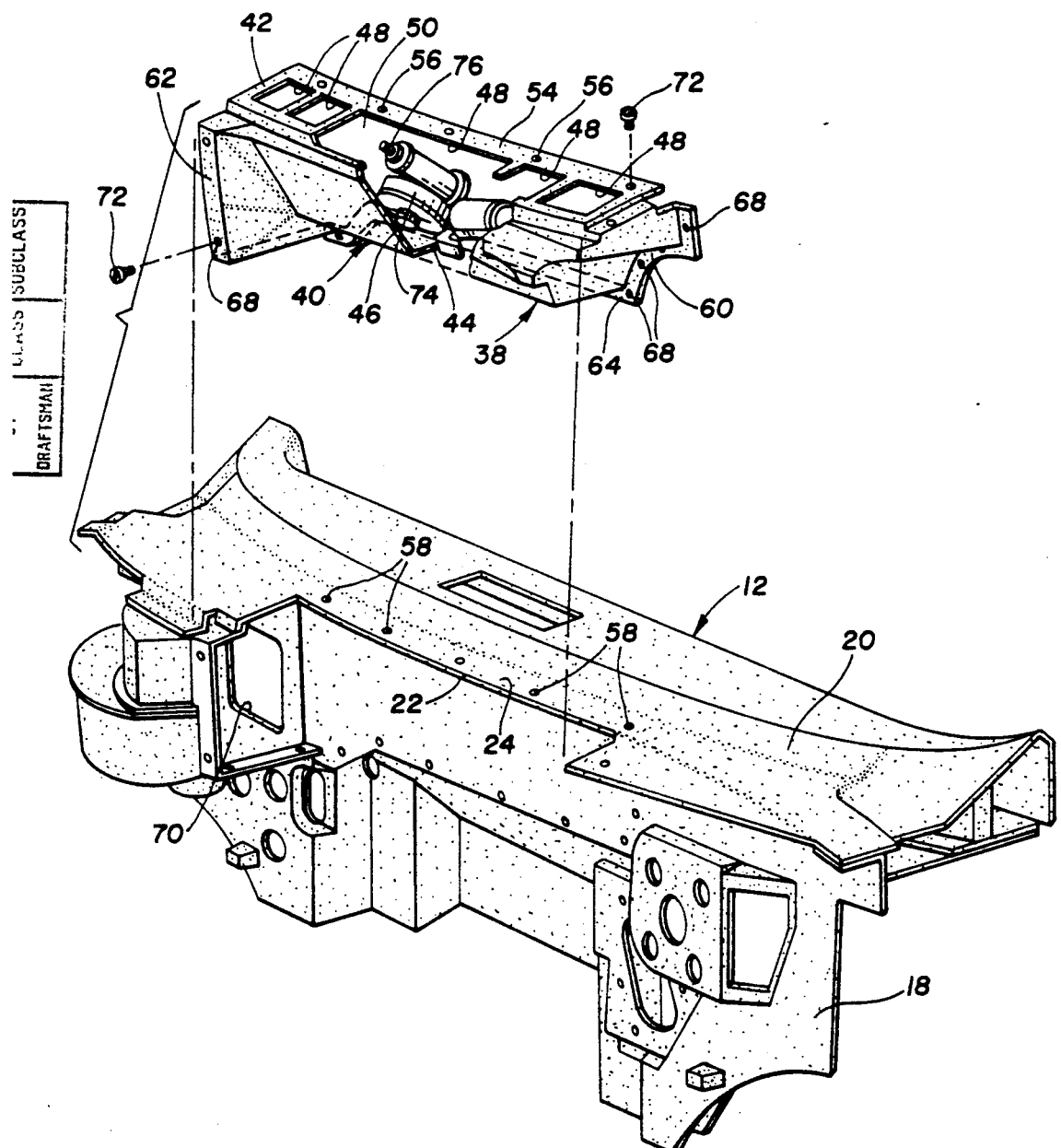
FIG. 2 is perspective view showing the vehicle bulkhead structure with the air inlet plenum and windshield wiper module removably detached from the bulkhead structure to enable improved access to the engine compartment for engine repair and removal.

Referring to FIGS. 1 and 2 it is seen that the plenum structure 38 is comprised of a composite reinforced plastic panel, preferably a structural reaction injection molded glass fiber reinforced plastic, molded to form a panel 40 having a generally horizontal extending top wall 42, horizontal extending bottom wall 44, and a generally vertically extending front wall 46. The top wall 42 has a plurality of air inlet openings 48 provided therein to admit air through the air inlet space 36 and into a transverse extending air flow passage 50 defined by the panel 40.

The panel 40 has a peripheral flange structure by which the panel 40 is attached to the bulkhead structure 12. In particular, as best seen in FIG. 2, the rear edge portion 54 of the top wall 42 has a plurality of screw holes 56 which overlie screw holes 58 provided in the flange 24 of bulkhead structure top panel 20. Furthermore, the panel 40 has a right-hand end flange structure 60, a left-hand end flange structure 62 and a bottom flange structure 64 which overly and engage against front wall 18 of the bulkhead structure. These flanges 60, 62 and 64 have a plurality of screw apertures 68. A plurality of screws 72 extend through the screw apertures 56 and 68 to attach the panel 40 onto the front wall 18 of the bulkhead structure. As best seen in FIG. 2, the front wall 18 has an air flow opening 70 provided therein which communicates with the transverse airflow passage 50 defined by the panel 40 so that the inlet air received through the inlet openings 46 is ducted though the bulkhead structure and into the heating, ventilating and air conditioning system.

Referring again to FIGS. 1 and 2, it is seen that the windshield wiper motor and transmission assembly, generally indicated at 74, is bolted or otherwise suitably attached to the panel 40 forming the air flow passage 50 and includes a shaft 76 for driving a windshield wiper.

As best seen in FIG. 2, the plenum structure 38 provided by the panel 40 is located generally in the center of the bulkhead structure 12. In order to repair or remove the engine, the engine compartment lid 32 is either opened or removed all together from the vehicle. Then the panel 40 is removed by removing the screws 72 which attach the panel 40 onto the bulkhead structure 12. Removal of the screws permit the panel 40 to be lifted from the vehicle body thereby greatly improving access to the engine compartment. FIG. 1 shows a broken line designated "A" which follows the path taken by the rear of the engine upon removal of the engine. The mounting of the windshield wiper motor and transmission assembly 74 on the plenum panel 40 also facilitates the repair or replacement of the windshield wiper.

Thus it is seen that the invention provides a new and improved air intake plenum structure for a vehicle body which is removable in order to facilitate access to the vehicle engine compartment.

The embodiments of the invention in which an exclusive property or privilege is claimed are defined as follows:

1. In a vehicle body having a bulkhead structure extending transversely between compartments for the passengers and the engine, the improvement comprising:

a C-shaped panel juxtaposed to the engine compartment side of the bulkhead structure and having upper and lower horizontally extending walls projecting forwardly from the bulkhead structure to overhang the engine and a vertically extending front wall spaced from the bulkhead by the upper and lower walls to define therewith a transverse airflow communicating passage, air inlet openings provided in the top wall to admit air into the passage, and removable fastening means removably fastening the panel on the bulkhead to permit removal thereof from overhanging the engine to enable engine repair and removal.

2. In a vehicle body having a bulkhead structure extending transversely between compartments for the passenger and the engine, the improvement comprising:

a C-shaped panel juxtaposed to the engine compartment side of the bulkhead structure and having upper and lower horizontally extending walls projecting forwardly from the bulkhead structure to overhang the engine and a vertically extending front wall spaced from the bulkhead by the upper and lower walls to define therewith a transverse airflow communicating passage, an air inlet opening provided in the top wall to admit air into the passage, an air flow opening provided in the bulkhead to communicate intake air through the bulkhead, a peripheral flange means integral with the panel and overlying the juxtaposed bulkhead structure, and a plurality of removable fasteners installed between the flange structure and the bulkhead structure to removably fastening the panel on the bulkhead and permit removal of the panel from overhanging the engine to enable engine repair and removal.

3. In a vehicle body having a bulkhead structure extending transversely between compartments for the passengers and the engine, the improvement comprising:

a panel removably attached to the engine compartment side of the bulkhead structure and having air inlet openings therein, said panel projecting forwardly from the bulkhead structure to define therewith an air passage communicating air transversely of the bulkhead and to overhang the engine, said panel being removably detached from the bulkhead to permit removal thereof from overhanging the engine to enable engine repair and removal, and a windshield wiper motor and transmission assembly mounted on the panel for removal from the vehicle body with the panel.

* * * * *